United States Patent
Pinnavaia et al.

(10) Patent No.: US 7,404,901 B2
(45) Date of Patent: Jul. 29, 2008

(54) METHOD FOR THE REMOVAL OF ARSENIC IONS FROM WATER

(75) Inventors: Thomas J. Pinnavaia, East Lansing, MI (US); Joel I. Dulebohn, Lansing, MI (US); Emily J. McKimmy, Trenton, NJ (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 11/440,474

(22) Filed: May 25, 2006

(65) Prior Publication Data

US 2006/0273015 A1    Dec. 7, 2006

Related U.S. Application Data

(60) Provisional application No. 60/687,782, filed on Jun. 6, 2005.

(51) Int. Cl.
*B01D 15/00* (2006.01)

(52) U.S. Cl. .................. 210/683; 210/688; 210/694

(58) Field of Classification Search .................. 210/683, 210/688, 694
See application file for complete search history.

(56) References Cited

U.S. PATENT DOCUMENTS 5,338,444 A * 8/1994 van Buren et al. .......... 210/660
6,465,387 B1 10/2002 Pinnavaia
6,649,083 B1 11/2003 Pinnavaia
2004/0229751 A1 11/2004 Pinnavaia
2005/0029198 A1 * 2/2005 Tepper et al. ............... 210/688
2006/0186052 A1 * 8/2006 Seidel et al. ................ 210/688

OTHER PUBLICATIONS

Abernathy, C.O., et al., Environ. Health Persp. 107 593-597 (1999).
Jain, C.K., et al., Water Res. 34, 4304-4312 (2000).
Melamed, D., Office of Superfund Remediation and Technology Innovation (2004).
Mercier, L., et al., Environ. Sci. Technol. 29, 1318-1323 (1995).
Feng, X., et al., Science 276 923-926 (1997).
Liu, A.M., et al., Chem. Commun. 2256-2257 (2000).
Yoshitake, H., et al., chem . . . Mater. 14, 4603-4610 (2002).
Yoshitake, H., et al., chem.. Mater. 15, 1713-1721 (2003).
Fryxell, G.E., et al., Chem. Mater. 11, 2148-2154 (1999).
Howard, A.G., et al., analyst 112, 159-162 (1987).
Walcarius, A., et al., Chem. Mater. 15, 4181-4192 (2003).
Raso, S.W., et al., J. Mol. Biol. 307 899-911 (2001).
Kluth, G.J., et al., Phys. Rev. B: Condens. Matter 59, R10449-R10452 (1999).
Iyer, R.G., et al., Inorg. Chem. 43, 3656-3662 (2004).
Helz, G.R., et al., Geochim. Cosmochim. Acta. 59, 4591-4604 (1995).

* cited by examiner

*Primary Examiner*—Chester T Barry
(74) *Attorney, Agent, or Firm*—Ian C. McLeod

(57) ABSTRACT

A method for the removal of arsenic ions from water with a porous silica composition with an organofunctional moiety comprising a thio which binds the arsenic ion and is then removed from the water. The method comprises the quality of the water.

6 Claims, 2 Drawing Sheets

METHOD FOR THE REMOVAL OF ARSENIC IONS FROM WATER

CROSS-REFERENCE TO RELATED APPLICATIONS

This application claims priority to provisional patent application Ser. No. 60/687,782, filed Jun. 6, 2005.

STATEMENT REGARDING FEDERALLY SPONSORED RESEARCH OR DEVELOPMENT

This invention was funded by the National Institute of Health Contract No. P42-ES04911 and the National Science Foundation Contract No. CHE-0211029. The U.S. Government has certain rights to this invention.

BACKGROUND OF THE INVENTION

(1) Field of the Invention

The present invention relates to a thio-, amino- and/or quaternary amino-functionalized silica, prepared by direct assembly methods, which is effective as a solid state trapping agent for the removal of arsenic from water.

Mesostructured silicas containing organofunctional moieties are known. This invention relies upon the disclosure of U.S. application Ser. No. 10/718,329, filed on Nov. 20, 2003, published as US2004-0229751, published Nov. 18, 2004, and owned by a common assignee, which is incorporated by reference in its entirety. U.S. Pat. Nos. 6,465,387 B1 and 6,649,083 B1 are also incorporated herein in their entirety.

Arsenic in naturally occurring form is found in soil, air and water. Of the two forms of inorganic arsenic found in ground water, namely, arsenite (As(III)) and arsenate (As(V)), arsenite is predominant. A variety of harmful health effects have been attributed to arsenic in drinking water (Abernathy, C. O., et al., *Environ. Health Persp.* 107 593-597 (1999). Furthermore, arsenite is estimated to be 60 times more toxic than arsenate (Jain, C. K., et al., *Water Res.* 34, 4304-4312 (2000)). Current remediation techniques (Melamed, D., Office of Superfund Remediation and technology Innovation (2004)) (e.g., coagulation, nanofiltration, or ion-exchange) are effective only in removing arsenate, but not arsenite, in part, because arsenite is not anionic below pH 8.5 in aqueous solution. Thus, the common approach to the removal of arsenite from ground water anticipates oxidizing arsenite to arsenate.

Functionalized mesostructured materials have been examined as adsorbents for heavy metals, especially mercury (Mercier, L., et al., *Environ. Sci. Technol.* 29, 1318-1323 (1995); Feng, X., et al., *Science* 276 923-926 (1997) and Liu, A. M., et al., *Chem. Commun.* 2256-2257 (2000)). These compounds have large surface areas, tailorable mesopore sizes to facilitate access to complexing ligands immobilized on the pore walls. They have not been disclosed to be useful for removal.

Current arsenic remediation efforts based on organo-functionalized mesostructures have focused on the trapping of arsenate (Yoshitake, H., et al., *chem . . . Mater.* 14, 4603-4610 (2002); Yoshitake, H., et al., *chem . . . Mater.* 15, 1713-1721 (2003); and Fryxell, G. E., et al., *Chem. Mater.* 11, 2148-2154 (1999)). One approach relies on the Lewis base properties of the anion and the formation of a complex with a Lewis acid metal centers (i.e., copper (II) or iron (III)) immobilized in the pores of the mesostructure (Yoshitake, H., et al., *Chem. Mater.* 15, 1713-1721 (2003); and Fryxell, G. E., et al., *Chem. Mater.* 11, 2148-2154 (1999)). The second strategy is based on ion pairing between an onium ion immobilized on the pore walls and anionic arsenate (Yoshitake, H., et al., *Chem. Mater.* 15, 1713-1721 (2003)). However, neither binding mechanism is effective in trapping arsenite.

Trivalent arsenic is known to have an especially high affinity for binding to mercaptan groups (Torchinskii, Y. M., *Sulfur in Proteins*; Pergamon Press: New York, (1981)). Moreover, mercaptans are much more selective toward binding to arsenite than to arsenate (Howard, A. G., et al., *analyst* 112, 159-162 (1987)).

OBJECTS

It is therefore an object of the present invention to provide a method for removal of arsenic ions from aqueous solutions. It is further an object of the present invention to provide a method which is easily performed and which is reliable. These and other objects will become increasingly apparent by reference to the following description and the drawings.

SUMMARY OF THE INVENTION

The present invention relates to a method for removal of an arsenic ion from an aqueous solution comprising: (a) providing a porous silica composition with an organofunctional moiety comprising thiol groups which binds the arsenic ion in the aqueous solution containing the arsenic ion; and (b) separating the porous silica composition containing the bound arsenic ion from the aqueous solution. Preferably the organofunctional silica is mesostructured. Preferably the organofunctional moiety comprises thiol groups. Preferably the organofunctional moiety further comprises protonated amino or quaternary amino groups. Preferably the organofunctional moiety comprises both the thiol groups and protonated amino or quaternary amino groups. Preferably the arsenic ion is arsenite and the organofunctional moiety is the thiol groups. Preferably the arsenic ion is arsenate and the organofunctional moiety comprises protonated amino or quaternary amino groups and thiol groups. Preferably the arsenic ion is arsenite and arsenate together and the organofunctional moieties comprise thiol groups and protonated amino groups.

Further, the method wherein the porous silica composition with the organofunctional moiety is admixed with activated carbon for use as an adsorbent for the purification of drinking water.

DESCRIPTION OF PREFERRED EMBODIMENTS

In light of the toxicity and prevalence of arsenite in ground water, the present invention provides a functionalized mesostructured silica for the direct trapping of arsenite, without the necessity of pre-oxidizing arsenite to arsenate.

The mesostructures of interest, denoted MP-HMS, have a wormhole framework structure and an anhydrous composition of $(SiO_2)_{1-x}(SiLO_{1.5})_x$, where L is a mercaptopropyl moiety and x is the mole fraction of framework silicon centers that have been functionalized. Compositions with x=0.10 to 0.50 were prepared by a one-pot, direct assembly process from tetraethylorthosilicate (TEOS) and 3-mercaptopropyltrimethoxysilane (MPTMS) in the presence of a structure-directing amine surfactant (dodecylamine) as the porogen in accord with a previously reported method, (Mori and Pinnavaia, Chem. Mater. 2001, 13, 2173-2178)) except in the framework pores (Walcarius, A., et al., *Chem. Mater.* 15, 4181-4192 (2003)) and allows for better crosslinking of the organosilyl group into the framework walls. See also U.S. application Ser. No. 10/718,329 cited above.

Arsenite uptake curves were obtained by slurrying a 200-mg quantity of MP-HMS with x=0.10, 0.20, 0.30, 0.40, and 0.50 in 20 ml of water containing different initial concentrations of arsenite ($H_3AsO_3$) for a period of 20 h at room temperature. The standardized $H_3AsO_3$ solution was adjusted to pH=7.0 with 0.11 N sodium hydroxide before mixing with MP-HMS. The equilibrated suspensions were filtered to remove the MP-HMS trapping agent and the filtrate was analyzed for arsenite by titrimetric oxidation with an iodine-starch solution (Fritz, J. S., et al., *quantitative Analytical Chemistry.* $4^{th}$ Ed; Allyn and Bacon: Boston (1979)).

Figure 1:
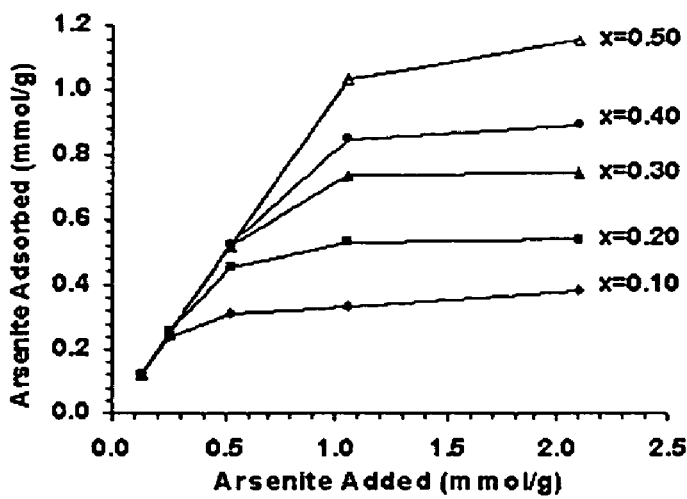
FIG. 1 is a graph showing arsenite uptake curve for functionalized $(SiO_2)_{1-x}(LSiO_{1.5})_x$ compositions (L=mercaptopropyl) with a wormhole framework structure, denoted MP-HMS.

As shown by the uptake curves in FIG. 1 the amount of arsenite adsorbed increased with increasing mercaptan functionalization. MP-HMS with x=0.10 and 0.20 quantitatively adsorb arsenite up to a SH/As ratio 10. For x=0.30, quantitative uptake of arsenite is observed up to SH/As 6.7. Increasing the mercaptan loading still further to x=0.40 and 0.50 resulted in quantitative uptake up to SH/As 5 or up to 20% of the mercaptan centers. Therefore, the higher the thiol ligand loading the more efficient the uptake of arsenite. Efforts to prepare HMS mesostructures with x>0.50 resulted in unstructured products.

In order to further characterize arsenite uptake by MP-HMS derivatives, the initial concentration of arsenic in solution was held constant at 323 ppm while also keeping the weight of MP-HMS and the volume of solution constant. In this way only the ratio of As(III) to SH was varied, depending on the value of x. The results are summarized in Table 1.

The non-functionalized HMS silica adsorbed a negligible amount of arsenite; indicating the arsenite adsorption is due to bonding with the mercaptan. With an excess of 10:1 thiol to arsenite, 98% removal of arsenite from solution is achieved. This ligand to arsenic ratio suggests that only a fraction of the framework thiol sites are available for arsenite binding.

Figure 2:
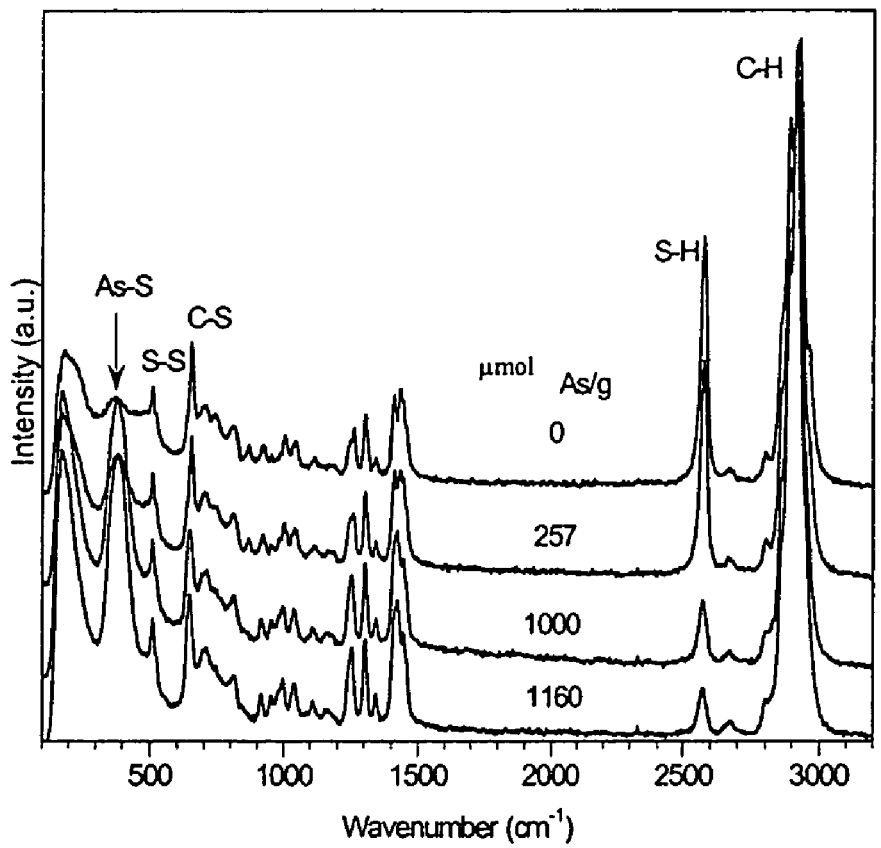
FIG. 2 is a graph showing Raman spectra of functionalized $(SiO_2)_{1-x}(LSiO_{1.5})_x$ compositions (L=mercaptopropyl, x=0.50) with a wormhole framework structure, denoted MP-HMS, after binding of arsenite at the µmol As/g levels shown. The spectra are offset on the y-axis for clarity.

Raman spectroscopy was utilized in order to verify the binding of the arsenite to the mercaptan (FIG. 2). For the initial MP-HMS mesostructure, the mercaptan S—H stretch appears as a strong band at 2560 $cm^{-1}$ (Raso, S. W., et al., *J. Mol. Biol.* 307 899-911 (2001); and Kluth, G. J., et al., *Phys. Rev. B: Condens. Matter* 59, R10449-R10452 (1999)). A weak band at 510 $cm^{-1}$ is assigned to a S—S stretch, indicating the presence of a small amount of disulfide due to air oxidation of adjacent thiol groups on the surface of the mesostructure (Kluth, G. J., et al., *Phys. Rev. B: Condens. Matter* 59, R10449-R10452 (1999)). The C—H stretch appears as a strong band 2900 $cm^{-1}$ (Kluth, G. J., et al., *Phys. Rev. B: Condens. Matter* 59, R10449-R10452 (1999)). For the mesostructures containing bound, an As—S stretch is present at ~375 $cm^{-1}$ (Iyer, R. G., et al., *Inorg. Chem.* 43, 3656-3662 (2004); and Helz, G. R., et al., *Geochim. Cosmochim. Acta.* 59, 4591-4604 (1995)). Although a weak band in this region is present in the parent MP-HMS (x=0.50), the intensity grows in proportion to arsenite adsorption, indicating the presence of an As—S bond. Additionally, the decrease in intensity of the S—H stretch with arsenite adsorption, gives evidence for the binding of the arsenite directly to the thiol. No change in the S—S stretch was observed with arsenite loading, even though it has been reported that disulfides form stable complexes with arsenic (Dominguez, L., et al., *React. Func. Polym.* 53, 205-215 (2002)). In addition to the possible binding of arsenic to more than one sulphur, another potential explanation for the inability of all the mercaptan ligands to bind in a one to one manner with arsenic is related to the accessibility of the thiol groups. The Raman spectra do not rule out the possibility that arsenite might be bound to selected thio sites in the silica framework. The limited presence of these "selected" sites might be a reason that binding of one ligand to one arsenic is not observed.

The above results represent the first disclosure of the remediation of arsenite by a mesostructured organo-silica. Arsenite concentration was reduced by up to 98% under batch equilibrium conditions. More efficient removal can be achieved under column processing conditions. Moreover, the adsorption of arsenite requires no additional processing steps, such as pre-oxidation arsenite to arsenate or pH adjustment of the trapping agent. In addition, the trapping agent itself is

TABLE 1

Adsorption of arsenite at pH = 7.0 by MP-HMS mesostructures with the anhydrous compositions of $(SiO_2)_{1-x}$ $(SiLO_{1.5})_x$, L = mercaptopropyl.

| MP-HMS | Initial ppm ($H_3AsO_3$) | Final ppm ($H_3AsO_3$) | mmol SH/g | µmol As/g added | µmol As/g adsorbed | % Removal |
|---|---|---|---|---|---|---|
| X = 0.00 | 323 | 313 | 0.0 | 525 | 4.9 * $10^{-4}$ | 1.8 |
| X = 0.10 | 323 | 22.3 | 1.4 | 263 | 244 | 93 |
| X = 0.20 | 323 | 6.1 | 2.6 | 263 | 259 | 98 |
| X = 0.30 | 323 | 6.3 | 3.6 | 263 | 257 | 98 |
| X = 0.40 | 323 | 6.1 | 4.4 | 263 | 252 | 96 |
| X = 0.50 | 323 | 6.3 | 5.3 | 263 | 257 | 98 | prepared by a simple one-pot method that allows the surfactant template to be removed by Soxhlet extraction and recycled.

It also is possible to simultaneously remove both arsenite and arsenate ions in the form of $(H_2AsO_4)^-$ from aqueous solution under ambient conditions of temperature and pH using organofunctional silica in which thiol and amino functional groups are covalently linked to the silica surface. Mesoporous organofunctional silica with the composition $(SiO_2)_{1-(x+y)}(LSiO_{1.5})_x(L'SiO_{1.5})_y$, where L equals mercaptopropyl (MP) and L' equals aminopropyl (AP), were prepared using dodecylamine as the pore-forming surfactant.

Arsenate (As(V)) adsorption by protonated AP–HMS and protonated MP+AP–HMS was performed by slurrying 200-mg quantities of functionalized MP+AP–HMS silica in 20 mL of $(H_2AsO_4)^{2-}$ solution of known concentration for a period of 20 h at room temperature. The arsenate solutions were adjusted to pH=7.0. The equilibrated suspensions were filtered to remove the trapping agent. The filtrate was titrated with 0.001 M sodium thiosulphate to a clear endpoint (Fritz, J. S., et al., *Quantitative analytical Chemistry*. 4$^{th}$ Ed. Allyn and Bacon: Boston, p 661 (1979)).

As can be seen from the results presented in Table 2, 97-98% of the arsenate ions initially preset in solution are removed by the organofunctional silica.

TABLE 2

Adsorption of (H2AsO4)-arsenate anions by (SiO2)1 − (x + y) (LSiO1.5)x (L'SiO1.5)y compositions (L = mercaptopropyl, L'-aminopropyl), denoted MP + AP-HMS

| Adsorbent | Mmol NH2/g | Initial ppm $(H_2AsO_4)^-$ | Final ppm $(H_2AsO_4)^-$ | Mmol $(H_2AsO_4)^-$ Added/g | mmol $NH_2$/mmol $(H_3AsO_4)^-$ Added | mmol $(H_2AsO_4)^-$ Adsorbed/g | mmol $NH_2$/mmol $(H_2AsO_4)^-$ Adsorbed | % Removal |
|---|---|---|---|---|---|---|---|---|
| X = 0.25 Y = 0.19 | 2.17 | 327 | 5.48 | 0.237 | 9.16 | 0.230 | 9.43 | 98.0 |
| X = 0.25 Y = 0.19 | 2.17 | 161 | 4.85 | 0.167 | 12.99 | 0.113 | 19.20 | 97.0 |

The bifunctional compositions were denoted MP+AP–HMS.

To synthesize the bi-functional MP+AP–HMS mesostructures with lower organic incorporation x=y=0.15, a mixture of MPTMS, APTMS, TEOS was added to a solution of surfactant, EtOH, and water to form the reaction mixture. Ethanol, DDA, and water were mixed and warmed to 35° C. A x:y :1−(x+y) molar mixture of x MPTMS, y (APTMS), and 1−(x+y) TEOS was added dropwise to the surfactant water mixture. The entire mixture was shaken for 48 hours at 35° C. Finally, the solution was filtered, the precipitate collected and air-dried, followed by Soxhlet extraction with ethanol to remove the surfactant. The overall molar stoichiometry was:

1−(x+y) TEOS:x MPTMS:y APTMS:0.22 DDA:5.0 EtOH:160$H_2O$. The air-dried product was then protonated by reaction with 0.1 molar hydrogen chloride solution, filtered, washed, and air-dried. The non-protonated product was found to be not as effective in removing arsenite but was effective in removing lead. Thus a mixture of protonated and non-protonated amines is preferred.

In order to synthesize the bi-functional MP+AP–HMS mesoporous silica with greater organic incorporation x=y=0.25, a partially hydrolyzed solution of MPTMS and TEOS in EtOH was added to an ethanol and surfactant solution with APTMS being added in this step. Then, water was added to complete the reaction mixture. A x:1−(x+y) molar mixture of x MPTMS and 1−(x+y) TEOS was added to one-half of the ethanol and aged at 35° C. for 1 hour. After the 1 hour of pre-hydrolysis time, the y APTMS, remaining ethanol, and surfactant, DDA, were added. The silane, surfactant and ethanol mixture was allowed to react for 5 min before the water was added. The entire mixture was shaken for 48 hours at 35° C. Finally, the solution was filtered, the precipitate collected and air-dried, followed by Soxhlet extraction with ethanol to remove the surfactant. The overall molar stoichiometry employed was:

1−(x+y) TEOS:x MPTMS:y APTMS:0.22 DDA: 5.0EtOH:160$H_2O$.

Figure 3:
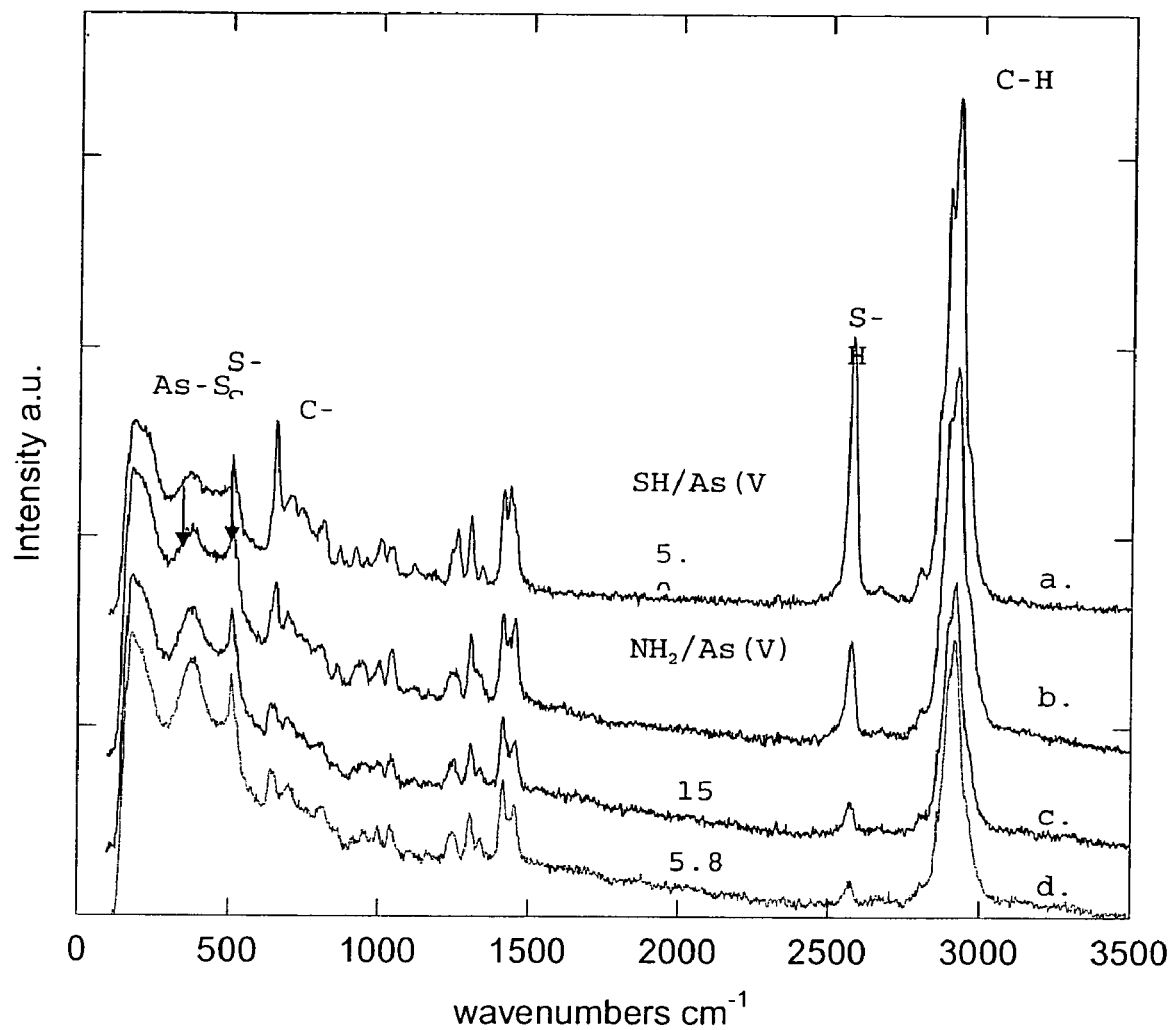
FIG. 3 is a graph showing Raman spectra for a. MP-HMS with x=0.50 after arsenate adsorption SH/As(V)=5.0. b. parent mesostructure MP+AP–HMS with x=0.25 and y=0.19. c. and d. MP+AP–HMS with x=0.25 and y=0.19 after binding of arsenate at the $NH_2/As(V)$ levels shown. The spectra are offset on the y-axis for clarity.

Even more efficient removal of arsenate can be achieved under column processing conditions. In comparison, organosilica compositions functionalized exclusively by mercaptopropyl (MP) groups were ineffective in removing arsenate anions from solution. Under conditions equivalent to those described in Table 2, less than 3% of the arsenate initially present in solution was removed from solution by MP-HMS silica. However, protonated AP–HMS and MP+AP–HMS are highly effective in removing arsenite from aqueous solution. Protonated AP HMS can remove 90% of the arsenate from a 323 ppm arsenate solution. Under ambient conditions of pH and temperature, a protonated MP+AP–HMS silica with x=0.5 and y=0.19 removed 99% of the arsenic (III) present in solution at an initial concentration of 323 ppm. The protonated MP+AP–HMS is effective for arsenate (and arsenite) trapping. The bi-functional mesostructure was able to reduce the arsenate concentration by 98%. For both mesostructures there was a substantial excess of total amine ligand to total As(V) in the reaction system. The ratio of aminopropyl: arsenate ≧6.0 was needed for quantative uptake of arsenate by protonated MP+AP–HMS or protonated AP–HMS. However, the bi-functional MP+AP–HMS silica was able to reduce the concentration of arsenate to one of the lowest reported of any mesostructure namely, 5 ppm. One explanation for the improved arsenate trapping by the bi-functional mesostructure is the thiols might play a role in arsenate reduction. The occurrence of some very interesting chemistry for arsenate adsorption to MP+AP–HMS was observed by Raman spectroscopy (FIG. 3).

The Raman thiol band is retained in the protonated mesostructure as evidenced by the S—H stretch at 2560 cm$^{-1}$ (Kluth, G. J.; Carraro, C.; Maboudian, R. Phys. Rev. B: Condens. Matter 1999, 59, (16), R10449-R10452; Raso, S. W.; Clark, P. L.; Haase-Pettingell, C; King, J; Thomas, G. J., Jr. J. Mol. Biol. 2001, 307, (3), 899-911; and Nakamoto, K. Infrared and Raman Spectra of Inorganic and Coordination Compounds, Fifth ed., John Wiley & Sons, Inc.: New York, 1997)).

However, a decrease in the S—H stretch was observed with arsenate trapping. No change in intensity of this stretch was expected upon exposure to arsenate because the arsenate showed no affinity for MP-HMS. Furthermore, an increase in the intensity of the S—S stretch at 510 cm$^{-1}$ (Kluth, G. J.; Carraro, C.; Maboudian, R. Phys. Rev. B: Condens. Matter 1999, 59, (16), R10449-R10452) was observed with arsenate binding, signaling an increase in the amount of disulfide present with arsenate loading. The disulfide is initially formed through the oxidation of neighboring thiols during the synthesis of MP+AP–HMS. The increase in the intensity of the disulfide band with exposure to arsenate loading indicates that arsenate is being reduced to arsenite by the thiol, which is acting as a reducing agent. In turn, the thiol is being oxidized to disulfide. Moreover, the As—S stretch, (Helz, G. R.; Tossell, J. A.; Charnock, J. M.; Pattrick, R. A. D.; Vaughan, D. J.; Garner, C. D. Geochim. Cosmochim. Acta 1995, 59, (22), 4591-4604 and Iyer, R. G.; Kanatzidis, M. G. Inorg. Chem. 2004, 43, (12), 3656-3662) in the region of 375-450 cm$^{-1}$ grows in intensity with arsenate adsorption. This indicates the trapping of arsenite through reaction with the remaining thiol.

The change in the intensity of the As—S band for the MP+AP–HMS samples is due to the adsorption of arsenic in the form of arsenite. To further determine if the arsenite was indeed being trapped by the thiol, the arsenate filtrate, after exposure to the MP+AP–HMS trapping agent, was examined for the presence of arsenite. The titration for arsenite was done under basic conditions, so that any arsenite in solution was oxidized to arsenate by $I_2$. It was verified that no arsenite was in the MP+AP–HMS filtrate exposed to arsenate and therefore must have been trapped by the remaining thiol.

In the biologically important arsenate reductase mechanism, the system by which arsenate is reduced to arsenite in the body in order to rid itself of the pollutant, a deprotonated thiol (from a cysteine) binds arsenate. Thiol is then oxidized to disulfide, and the arsenate is reduced to arsenite with a concomitant release of water. This thiol- and amine-rich environment involved in the arsenate reductase mechanism is mimicked in the bi-functionalized HMS system. Therefore, although arsenate has no affinity for HMS functionalized only with mercaptan because it never reaches the thiol reaction site, a mesostructure that is rich in both amine and thiol groups, a more suitable trapping environment is created. The arsenate is trapped by the protonated amines and then is reduced by the thiol to arsenite. The thiol is oxidized to disulfide, but the arsenite is then trapped by the remaining unoxidized thiol.

Thus, organofunctional silica containing organothiol and organoamine groups covalently linked through carbon-silicon bonds to the surface of silica are well suited for removing both As(V) [arsenate] and As(III) [arsenite] from drinking water under ambient conditions of pH and temperature.

The above results show that the presence of protonated amino group facilitates the initial binding of arsenate to the silica surface. Once bound to the surface, the arsenate ion can be reduced by reaction with the thiol functional groups to arsenite. The arsenite moiety is then converted to thioarsenite through covalent bond formation between arsenic (III) and the sulphur atom of the thiol group. Even greater arsenate binding efficiency can be produced by replacing the protonated amino organofunctional groups of MP+AP–HMS with quaternary ammonium ions. In this way electrostatic interactions between the quaternary ammonium and arsenate ions can enhance the initial binding of arsenate for subsequent reduction to arsenite and the formation of bound thioarsenite.

The method of the present invention may be used in combination with activated carbon for the preparation of an adsorbent for the point-of-use purification of drinking water. Activated carbon is effective as an adsorbent for the removal of organic impurities from water, but it is ineffective as an adsorbent for the removal of arsenic, particularly arsenic in arsenate form. Mixtures of the porous silica composition of this invention and activated carbon serve the dual purpose of removing both organic contaminants as well as inorganic contaminants that include arsenic and other heavy elements that covalently bind to thiol and amine groups.

It is intended that the foregoing description be only illustrative of the present invention and that the present invention be limited only by the hereinafter appended claims.

We claim:

1. A method for removal of an arsenic ion from an aqueous solution comprising:
   (a) providing a porous silica composition with an organofunctional moiety comprising thiol groups which binds the arsenic ion in the aqueous solution containing the arsenic ion, wherein the organofunctional moiety further comprises protonated amino or quaternary amino groups; and
   (b) separating the porous silica composition containing the bound arsenic ion from the aqueous solution.

2. The method of claim 1, wherein the organofunctional silica is mesostructured.

3. The method of any one of claims 1 or 2, wherein the arsenic ion is arsenite.

4. The method of any one of claims 1 or 2, wherein the arsenic ion is arsenate.

5. The method of any one of claims 1 or 2, wherein the arsenic ion is arsenite and arsenate together.

6. The method of any one of claims 1 or 2, wherein the porous silica composition with the organofunctional moiety is admixed with activated carbon for use as an adsorbent for the purification of drinking water.

* * * * *